Figure 1:
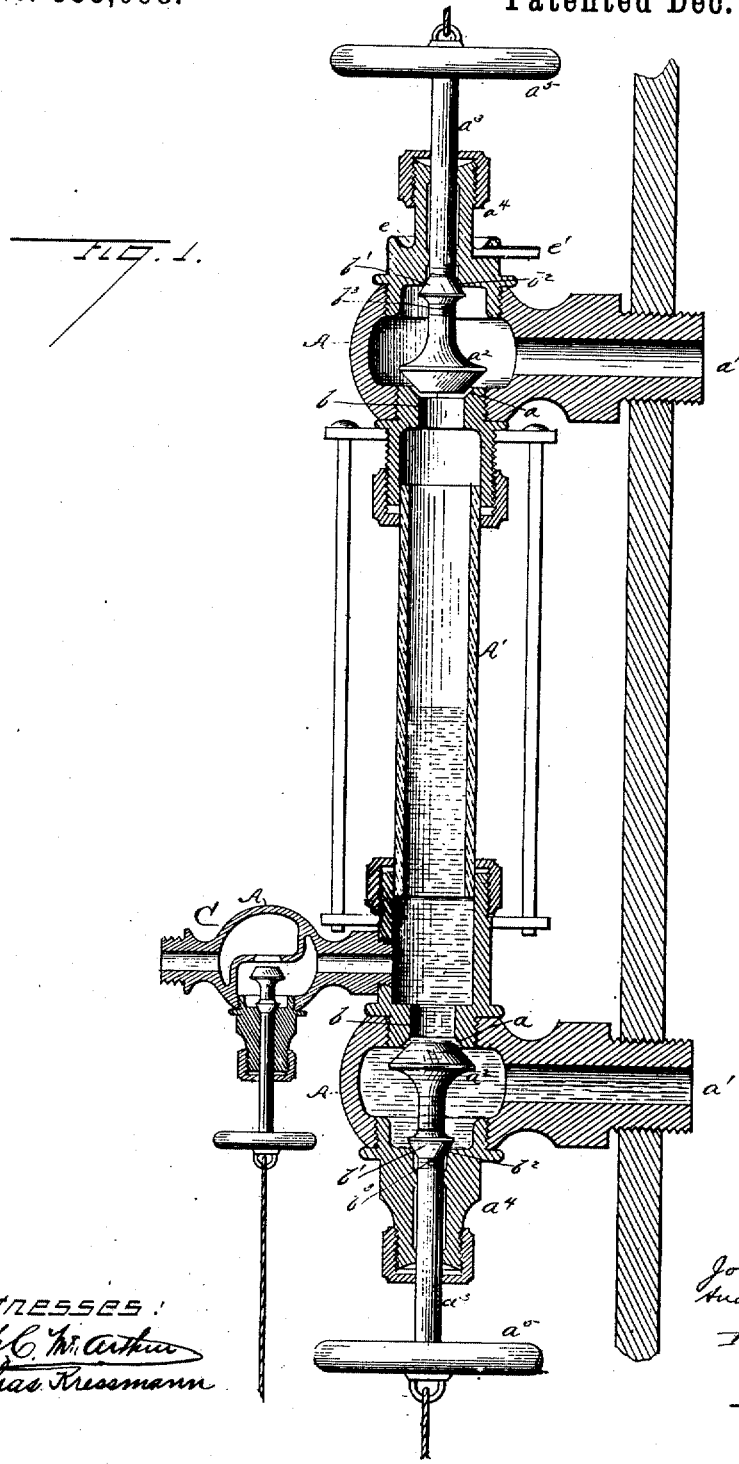

(No Model.) 2 Sheets—Sheet 1.

J. L. NELSON & A. F. LAUDERHOLM.
WATER GAGE VALVE.

No. 355,098. Patented Dec. 28, 1886.

Witnesses:
H. C. McArthur
Chas. Kressmann

Inventors,
John L. Nelson
Andrew F. Lauderholm
per
H. Harrison
Attorney.

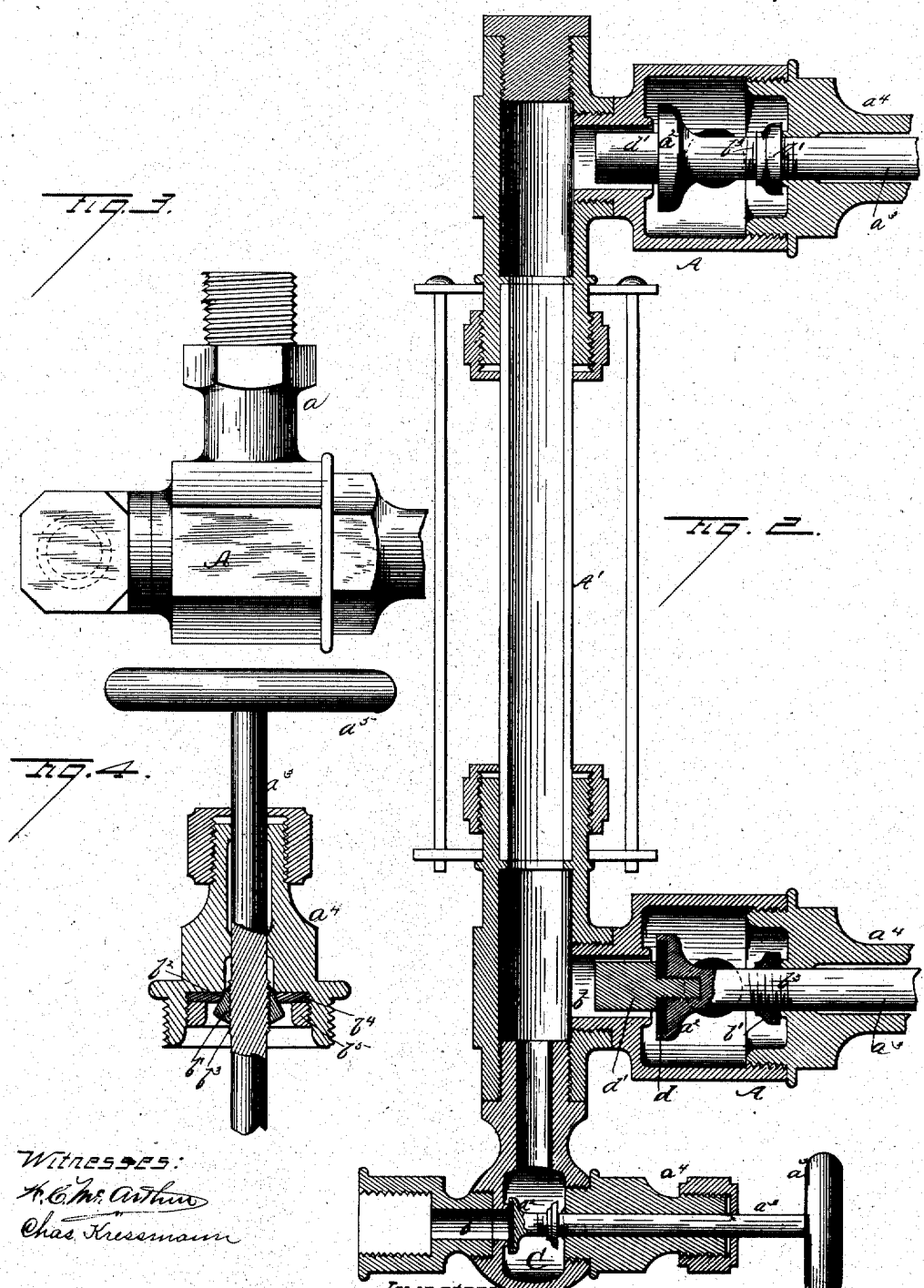

UNITED STATES PATENT OFFICE.

JOHN L. NELSON AND ANDREW F. LAUDERHOLM, OF CHICAGO, ILLINOIS.

WATER-GAGE VALVE.

SPECIFICATION forming part of Letters Patent No. 355,098, dated December 28, 1886.

Application filed September 30, 1885. Serial No. 178,648. (No model.)

*To all whom it may concern:*

Be it known that we, JOHN L. NELSON and ANDREW F. LAUDERHOLM, the former a citizen of the United States and the latter a subject of the King of Sweden, residing at Chicago, in the county of Cook and State of Illinois, have invented certain new and useful Improvements in Valves for Steam and Water Gages, of which the following is a specification, to wit:

This invention relates to valves for steam and water gages; and it consists in the peculiar construction and arrangement of the same, substantially as will be hereinafter more fully set forth and claimed.

In order to enable others skilled in the art to which our invention appertains to make and use the same, we will now proceed to describe its construction and operation, referring to the accompanying drawings, in which—

Figure 1 is a vertical section of a water and steam gage; Fig. 2, a similar view of a slightly-different form of gage, and Figs. 3 and 4 are detail views of parts of the invention.

A represents the shell of a valve, which is of any desired or convenient form, having a seat, $a$, which in Fig. 1 is shown as conical, and in Fig. 2 is shown as a raised ring, against which the valve seats. Each shell is provided with a stem or connection, $a'$, for attachment to the boiler, and the two valve-shells A are connected by a glass tube, A', to form a steam and water gage for determining the water in a steam-boiler or similar place. Each shell A is provided with a valve, $a^2$, having a stem, $a^3$, which slides freely in a suitable packing-box, $a^4$, and has a handle, $a^5$, on its outer end, to enable it to be operated by hand when desirable.

It will be observed that the shell A is formed with a short passage or throat, $b$, between its valve-seat and the end of the tube, which is of smaller diameter than either the tube or the shell behind the seat, and will in consequence pass a smaller quantity of steam or water than the capacity of said tube.

The object of contracting the throat is to obstruct the free passage of all the steam and water brought to this point by the connections, and thus when a glass breaks cause an increased pressure behind the valve, more certainly and firmly pressing it down to its seat, as will be at once understood.

When in use and steam has been raised upon the boiler, the opening of one of these valves will allow the steam or water to rush in and open the other one, when, as the steam and water fill the gage-tube and the pressure therein becomes the same as in the boiler, the pressure on the seating face of each valve is greater than on its rear, because of the greater area of this face, and the valves are therefore held open as long as pressure remains on the boiler or the gage remains intact. Should the glass be broken, as often occurs, the steam and water and the pressure therein are at once relieved, and as the steam and water behind the valves rush out through the throat $b$ in less quantities than they are supplied or can be carried off, the extra amount represents a pressure that acts on the rear of the valve and at once closes it. This occurs almost instantly upon the breaking of a glass, and no steam or water escapes into the room, and no danger is incurred by attempting to close the valves, they being automatic in their action.

In order that the valve shall not be opened farther than is necessary to its proper operation, as well as to prevent the escape of steam around the sliding stem, I provide the latter with a small collar, $b'$, which seats itself like a valve on a seat, $b^2$, as the valve is drawn back, and this collar is adjusted by means of a screw-thread, $b^3$, on the stem to regulate the throw of the valve to the last degree.

To the lower portion of the gage is secured a blow-off, C, which is also provided with a sliding valve and stem, such as described in the main part of the gage, and while this is opened by the attendant it is closed automatically by the pressure, as just described.

In Figs. 2 and 3 is represented a gage of slightly different form from that already specified, but constructed upon exactly the same principle. In this the valve, instead of being conical, is flat on its seating face, and is provided with a packing, $d$, of soft metal or other material, to form a more perfect seat and prevent the escape of steam; but this, as in the first case, has a limited throw, in order to render the pressure unequal in case of breakage, and the throat is further contracted by means of a cylindrical plug, $d'$, projecting therein from the face of the valve, and forming or leaving an annular space between the plug and the throat, which space allows sufficient steam to retain the pressure in the unbroken glass tube. This readily allows of the proper communication between the boiler and glass when all is in shape; but the plug so contracts the throat in capacity that when a glass breaks and the pressure is relieved from the outer end of the plug the action and effect of this is the same as that before referred to, and the plug may be attached to the conical valve also, if so desired, and renders the fine adjustment of its movement of less consequence.

The valve-shell A is in Fig. 1 formed below its stuffing-box with a groove, $e$, to receive the drip from any condensation of leaking steam which may accumulate around the sliding valve-stem, and on one side this groove is provided with a spout, $e'$, to conduct these drippings off where they will not drop upon and injure the gage-tube.

While the valve is described and is especially adapted to gages, it is readily applied to other purposes, as the form shown in the blow-off C will indicate, and the shape of the valve and seat is not material, and may be changed at will, so the contraction of the capacity of the throat is maintained to render the valve automatic in its action. Gages are often placed at points which by height or location render them inconvenient to reach, and in that case we attach to each valve-stem a pull-cord, which is led to a convenient point and used to pull the valves open, as will be at once understood by reference to Fig. 1.

The adjustable collar $b'$, acting as a valve to seat tightly around the sliding stem and maintain a steam-tight joint, we prefer to seat, as seen in Fig. 4, upon a soft-metal packing-surface, $b^4$, held in place by a screw-ring, $b^5$, and which may be renewed at any time.

Having thus fully described our invention, what we claim as new, and desire to secure by Letters Patent, is—

1. In a steam and water gage, a shell having a valve-seat and throat formed therein, in combination with a sliding-stem valve provided with a cylindrical plug on its face projecting into said throat, leaving only a narrow annular free space for the passage of the fluid, substantially as and for the purpose set forth.

2. The combination, with a valve-shell, of a sliding-stem valve having its stem provided with an adjustable collar seating against said shell when the valve is open, whereby the throw of the valve is adjusted as desired, substantially as and for the purpose set forth.

3. A valve-shell formed with a groove around it below its stuffing-box to receive the drip from steam leaking around the valve-stem, substantially as shown and described.

4. In a steam or water gage, the combination, with the glass gage-tube and the valves at either end, of a drip-receptacle formed in the upper valve-shell and a spout connected therewith to conduct the drippings away from the tube, substantially as and for the purpose set forth.

5. The valve-shell A, formed with a seat, $a$, and provided with a stuffing-box, in combination with the valve $a^2$, having a stem, $a^3$, sliding in said box, the thread $b^3$, and adjustable collar $b'$ thereon, substantially as and for the purpose set forth.

6. The combination, with the valve-shell A and its stuffing-box, provided with a soft-metal packing-surface, $b^4$, of the sliding valve-stem $a^3$, provided with the adjustable collar $b'$, substantially as and for the purpose set forth.

In testimony whereof we affix our signatures in presence of two witnesses.

JOHN L. NELSON.
ANDREW F. LAUDERHOLM.

Witnesses:
W. C. McArthur,
Chas. Kressmann.

Correction in Letters Patent No. 355,098.

It is hereby certified that the name of one of the patentees in Letters Patent No. 355,098, granted December 28, 1886, for an improvement in "Water-Gage Valves," was erroneously written and printed "Andrew F. Lauderholm," whereas said name should have been written and printed *Andrew F. Landerholm;* and that said Letters Patent should be read with this correction therein that the same may conform to the record of the case in the Patent Office.

Signed, countersigned, and sealed this 18th day of January, A. D. 1887.

[SEAL.]

D. L. HAWKINS,
*Acting Secretary of the Interior.*

Countersigned:
R. B. VANCE,
*Acting Commissioner of Patents.*